United States Patent [19]
Oguro et al.

[11] Patent Number: 5,479,347
[45] Date of Patent: Dec. 26, 1995

[54] VEHICLE DIAGNOSIS SYSTEM

[75] Inventors: Hirokazu Oguro, Okazaki; Akihito Iwai, Chiryu; Katsumi Takaba, Obu, all of Japan

[73] Assignee: Nippondenso Co., Ltd., Kariya, Japan

[21] Appl. No.: 260,408

[22] Filed: Jun. 14, 1994

[30] Foreign Application Priority Data

Jun. 17, 1993 [JP] Japan ................................. 5-146261
Jun. 28, 1993 [JP] Japan ................................. 5-156810

[51] Int. Cl.⁶ ............................................. G01M 15/00
[52] U.S. Cl. ..................... 364/424.04; 364/424.03; 73/118.1
[58] Field of Search ................. 73/118.1; 364/424.04, 364/424.03; 340/438, 439

[56] References Cited

U.S. PATENT DOCUMENTS

| | | | |
|---|---|---|---|
| 4,748,843 | 6/1988 | Schäfer | 364/424.04 |
| 4,926,352 | 5/1990 | Staffe | 364/550 |
| 5,050,080 | 9/1991 | Abe | 340/439 |
| 5,276,619 | 1/1994 | Ohara et al. | 364/424.04 |
| 5,325,082 | 6/1994 | Rodriguez | 340/439 |

FOREIGN PATENT DOCUMENTS 4301733  10/1992  Japan .
5241988   9/1993  Japan .

*Primary Examiner*—Richard B. Chilcot, Jr.
*Assistant Examiner*—Max H. Noori
*Attorney, Agent, or Firm*—Cushman Darby & Cushman

[57] ABSTRACT

In a vehicle diagnosis system in which a diagnosis unit is connected to a control unit, the control unit determines whether or not there is a code read request from the diagnosis unit. When there is the request, it further determines whether or not code erase is in execution. When code erase is not in execution, an abnormality code stored in the standby RAM region of its CPU is searched for and the result is transmitted to the diagnosis unit. When code erase is in execution, on the other hand, the data after code erase (no abnormality code) is transmitted to the diagnosis unit. Thus, during code erase operation, the abnormality data before erase is prevented from being transmitted to the diagnosis unit.

Further, in case of a RAM value read request is made from a main CPU to other CPU in the controller, it is checked whether a requested address value from the main CPU to the other CPU agrees with the address value transmitted from the other CPU to the main CPU. When the address values agree, the flag XA4ANS is set. After a prescribed interval from this flag setting, the RAM value corresponding to the requested address are responsively sent out to the diagnosis unit. Therefore, transmission of erroneous information to the diagnosis unit can be prevented without fail.

11 Claims, 10 Drawing Sheets

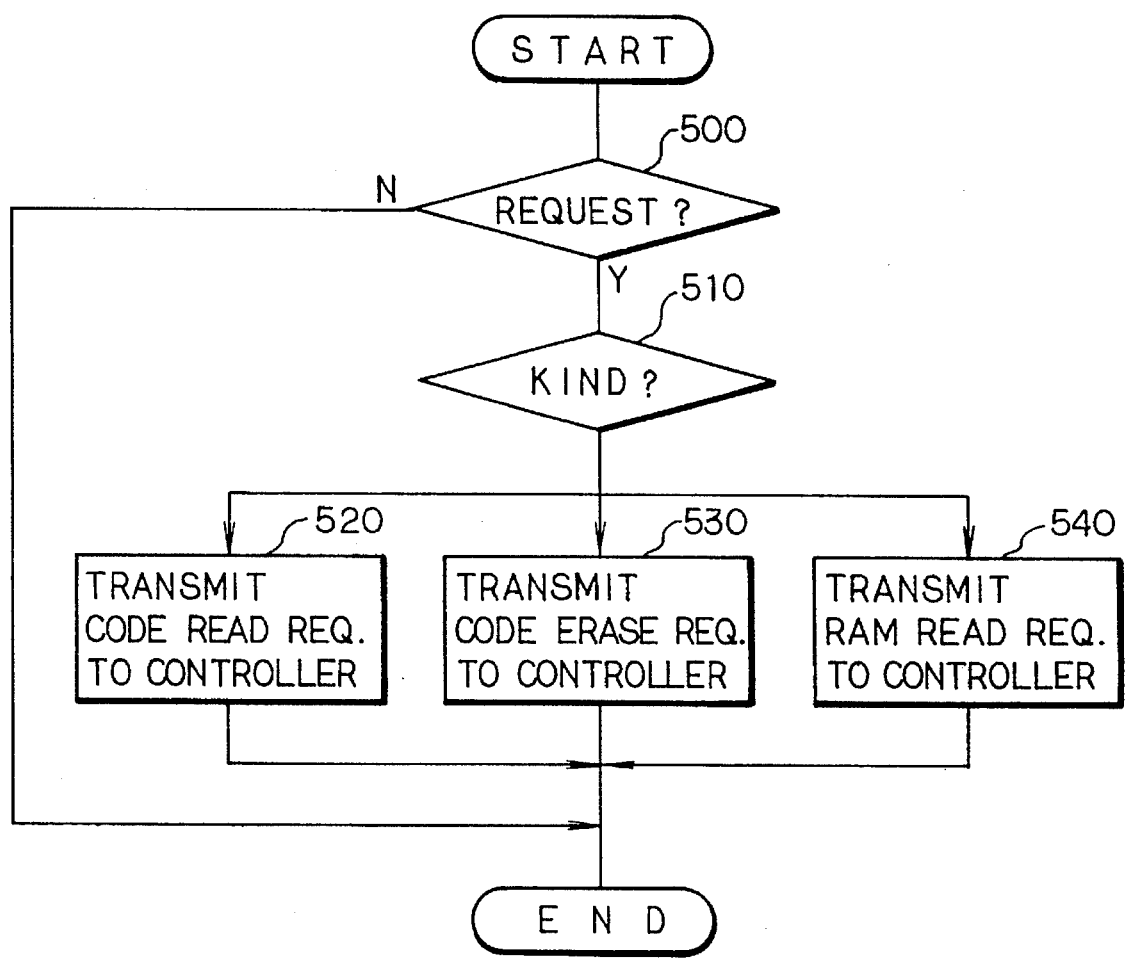

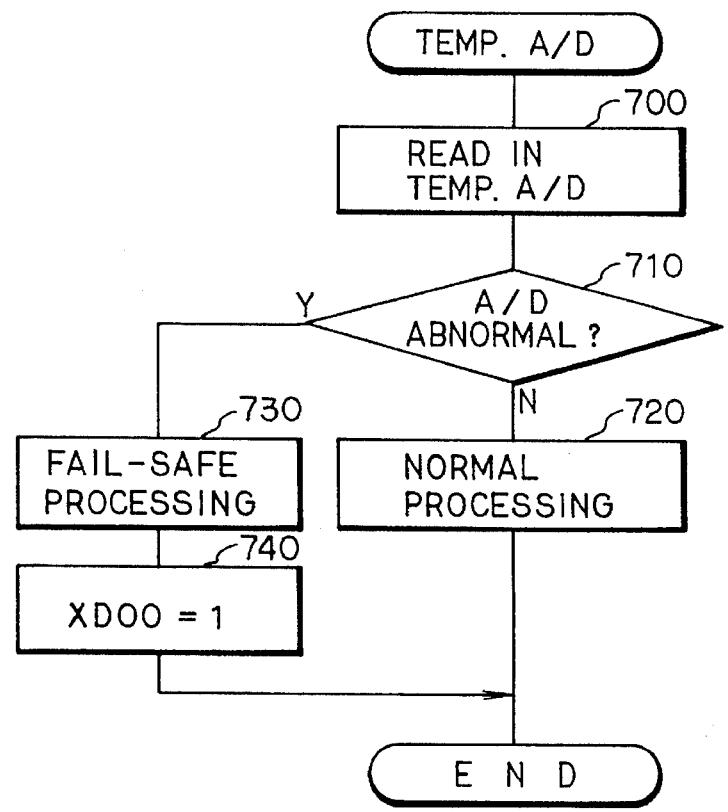
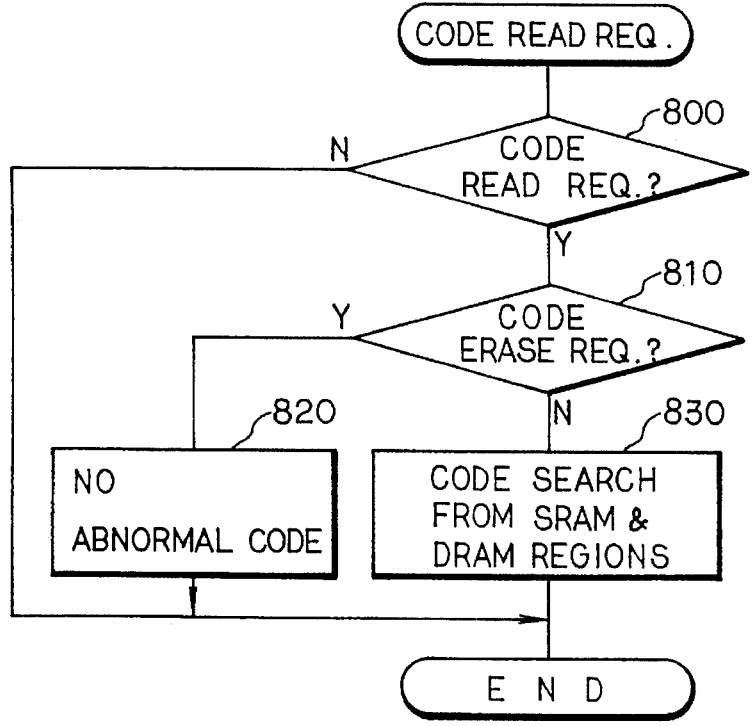

LAYOUT OF DMA
TRANSMISSION REGIONS

POINTER MOVEMENT OF DMA TRANSMISSION

VEHICLE DIAGNOSIS SYSTEM

BACKGROUND OF THE INVENTION

1. Field of the Invention

The present invention relates to a vehicle diagnosis system which conducts failure diagnosis and the like of a vehicle, and more particularly the invention is directed to prevention of erroneous abnormality or control information from a vehicle control unit to a diagnosis unit.

2. Description of Related Art

There is conventionally available a vehicle diagnosis system which detects various abnormalities in sensors, actuators or the like by means of a controller (vehicle control unit) mounted on a vehicle, stores abnormality information (code or data) about detected abnormalities, and reads out or erases the abnormality information stored in the controller by means of a diagnosis unit provided externally to the controller.

In the above-mentioned vehicle diagnosis system, when the diagnosis unit issues a read request of the abnormality information during execution of erase of the abnormality information in the controller in response to an erase request of the abnormality information from the diagnosis unit, the abnormality information before erasing is returned or transmitted to the diagnosis unit.

In the controller, it is the usual practice to conduct processing between the controller and the above-mentioned diagnosis unit and various processing operations for control of the vehicle such as engine control and transmission control within the same controller. Therefore, the controller is constructed by a plurality of CPUs (central processing units), and direct memory access (hereinafter simply referred to as "DMA") is used for data communication between the individual CPUs. In such a case, the problem mentioned above apparently appears, because the CPU effecting communication with the diagnosis unit cannot determine whether the data transmitted from the other CPUs through DMA is the one before or after erasing, with such data alone.

More particularly, in order to improve performance of the controller, various controls are divided to be shared by a plurality of CPUs ant the abnormality information, control information (RAM-value stored in RAM of the controller), is transmitted and received among the CPUs mutually by the use of direct memory access function (DMA).

In the event the control information of the controller constituted by a plurality of CPUs are read out by the diagnosis unit upon the read request from the diagnosis unit, a main CPU which transmits and receives data with the diagnosis unit first transmits by DMA an address value of RAM corresponding to the requested control information to a corresponding CPU. Then, the corresponding CPU responsively sends out to the main CPU the control information corresponding to the address value transmitted by DMA along with the address value. When the address value sent from the corresponding CPU by DMA agrees with the requested address value, the main CPU judges that the responding process by the corresponding CPU has been completed and sends out the control information to the diagnosis unit.

However, in case the data transmission is performed by DMA the DMA transmits to the corresponding CPUs sequentially the data (address value, control values and the like) stored in the DMA region at every prescribed interval (4 ms, for instance). As a result, data transmission cannot be managed by software. Therefore, even when the main CPU confirms that the address value transmitted from the corresponding CPU by DMA has agreed with the requested address value, there arises a case in which the control information at that moment does not correspond to the address value and there remains a possibility that erroneous information is transmitted to the diagnosis unit.

SUMMARY OF THE INVENTION

In view of the above-mentioned drawbacks, it is an object of the present invention to provide a vehicle diagnosis system which prevents transmission of erroneous information from a controller to a diagnosis unit.

It is a further object of the present invention to provide a vehicle diagnosis system which ensures accurate determination as to whether information to be transmitted is the one before or after erasing.

According to a first aspect of the present invention, an abnormality information transmitting device provided in a controller transmits abnormality information stored in a storage device when requested to read out the abnormality information by the read requesting device of a diagnosis unit. An abnormality information erasing device provided in the controller erases the abnormality information stored in the storage device when requested to erase the abnormality information by the erase requesting device of the diagnosis unit.

When the abnormality information has been erased by the abnormality information erasing device, the abnormality information transmitting device transmits the abnormality information after erasing. This prevents the abnormality information before erasing from being returned to the diagnosis unit, when reading out the abnormality information is requested by the erase requesting device of the diagnosing unit.

According to a second aspect of the present invention, read request address means writes into a first direct memory access region a desired address corresponding to control information, read request from read request means provided in the diagnosis unit. The read-out information write means writes into a second direct memory access region the address value and the control information or abnormality information corresponding to the desired address written into the first direct memory access region. A responding device responsively transmits to the diagnosis unit the control information written into the second direct memory access region after a prescribed time interval from the agreement of the address value written into the second direct memory access region with the desired address. Thus, when the address value written into the second direct memory access region agrees with the desired address value written into the first direct memory access region, the control information corresponding to the address value can be assuredly transmitted to the diagnosis unit.

BRIEF DESCRIPTION OF THE DRAWINGS

In the accompanying drawings:

FIG. 3 is a flowchart illustrating processing at a diagnosis unit;

FIG. 6 is a flowchart illustrating abnormality detection of a water temperature sensor;

FIG. 7 is a flowchart illustrating processing by a main CPU for a code read request;

DETAILED DESCRIPTION OF THE PREFERRED EMBODIMENT

Figure 1:
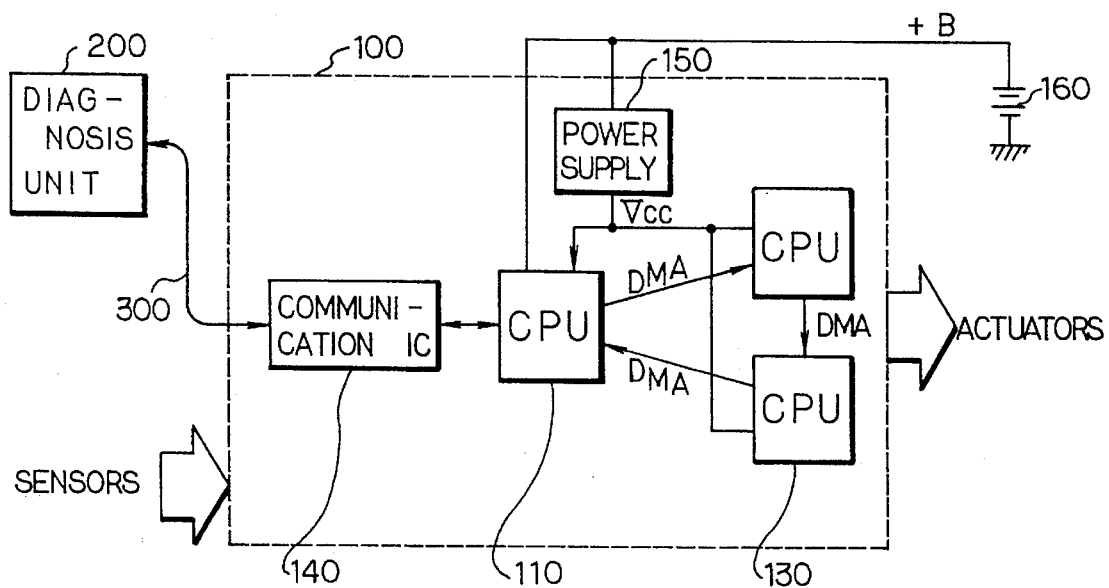
FIG. 1 is a configuration diagram of a vehicle diagnosis system of an embodiment of the present invention.

FIG. 1 is a configuration diagram illustrating a vehicle diagnosis system comprising a controller (vehicle control unit) 100 and a diagnosis unit 200.

The controller 100 and the diagnosis unit 200 are connectable by a bus 300. While a single controller is connected to the diagnosis unit 200 in this embodiment, a plurality of controllers may be connected to the single diagnosis unit.

The controller 100 has such functions as engine control, transmission control and abnormality detection which are known well in the art. The controller 100 has three CPUs, namely, a main CPU 110 and other CPUs 120 and 130 which conduct various kinds of control and data transmission by direct memory access (DMA). The controller 100 is also provided with a communication IC 140 which receives and transmits various data from and to the diagnosis unit 200, and a power supply IC 150 which converts a voltage +B (=12 V) fed from a vehicle-mounted battery 160 into a voltage Vcc (=5 V) and supplies the same to the individual CPUs 110, 120 and 130.

Upon input of signals from sensors which detect various states of the vehicle, the controller 100 issues control signals to various actuators which control the vehicle on the basis of the sensor signals. Each of the individual CPUs 110, 120 and 130 is a one-chip microcomputer having built-in ROM and RAM.

Figure 2:
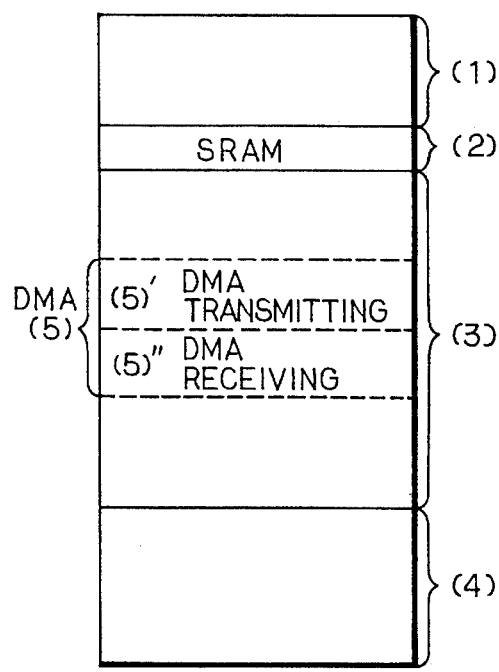
FIG. 2 is a configuration diagram of RAM of each CPU.

FIG. 2 is a configuration diagram of RAMs for the CPUs 110, 120 and 130. The regions (1) and (3) are RAM regions in which various operation data or control information and the like are stored. The region (5) in the RAM region (3) is a direct memory access region (hereinafter abbreviated as "DMA region"). In this DMA region (5), regions (5)' and (5)" are a DMA transmitting region and a DMA receiving region, respectively. Data stored in this DMA transmitting region (5)' is transmitted at prescribed intervals (4 msec, for example) to the DMA receiving region (5)" of other CPU. The data received in this DMA receiving region (5)" is sent to the DMA transmitting region (5)' in the same DMA region (5). Each of the CPUs 110, 120 and 130 transmits data received therein through DMA in the ring manner (in a sequence, for example, CPU 110→CPU 120→CPU 130→CPU 110) to the other CPUs. The regions (2) and (4) are standby RAM regions (hereinafter abbreviated as "SRAM regions") keeping storage thereof even when the ignition switch is turned off, and store vehicle abnormality information and the like.

Now the diagnosis unit 200 is described below in detail.

FIG. 3 is a flowchart illustrating processing in the diagnosis unit 200 when a diagnosis operator reads out various pieces of information, abnormality or control information, stored in the controller 100 through the diagnosis unit 200. The diagnosis unit 200 is started at prescribed intervals.

Presence of a processing request from the diagnosis operator is detected at step 500. When there is no processing request, this processing comes to an end. When there is a processing request, the kind of that processing request is detected at step 510. Kinds of processing request include a "code read request" requesting for reading out a diagnosis (DIAG) code detected by the controller 100, a "code erase request" requesting for erasing the DIAG code stored in the controller 100, and a "RAM-value read request" for reading out control information (RAM-value) of the desired address of each of the CPUs 110, 120 and 130.

Figure 4A:
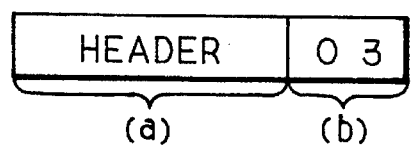
FIGS. 4A through 4C are schematic illustrations illustrating data format transmitted in response to various requests.

When the processing request as detected at the step 510 is a "code read request," the step 520 is to make an output of a code read request to the controller 100. The transmitted data has a construction as shown in FIG. 4A, where (a) is a header which is the information for judging whether or not a datum transmitted from the diagnosis unit 200 to the controller 100 is actually addressed the zero, and (b) is a datum representing the code read request.

Figure 4B:
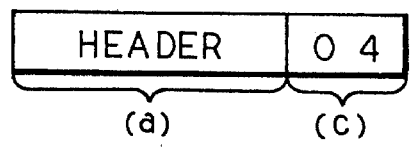

If a processing request issued by the diagnosis operator as detected at the step 510 is a "code erase request", the code erase request is sent to the controller 100 at step 530. The transmitted data has a construction as shown in FIG. 4B, where (c) is a datum representing a code erase request.

Figure 4C:
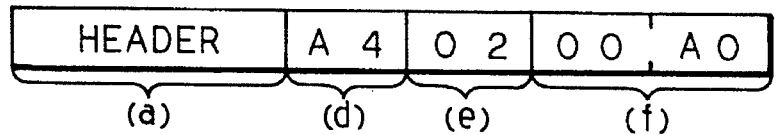

When the processing request as detected at the step 510 is a "RAM-value read request," step 540 is to issue an output of a RAM-value read request to the controller 100. More specifically, information specifying from which of the CPUs 110, 120 and 130 in the controller 100 the RAM-value is to be read out is transmitted. The transmitted data has a construction as shown in FIG. 4C, where (d) is a datum representing the RAM-value read request, (e) is a datum representing the number of the covered CPU, and (f) is a datum showing the requested address value.

Now, abnormality detection and abnormality information storing operations carried out by the controller 100 are described in the following.

Figure 5:
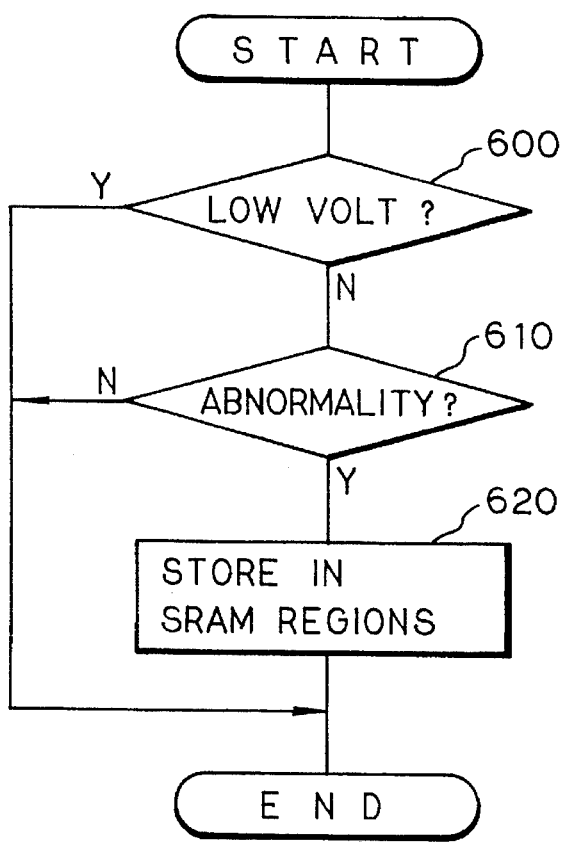
FIG. 5 is a flowchart illustrating processing for storing a DIAG code corresponding to an abnormality in the standby RAM region.

FIG. 5 is a flowchart illustrating, when an abnormality is detected through abnormality detection as described later, storing operation of a DIAG code corresponding to that particular abnormality in the above-mentioned SRAM regions (2) and (4). This is started at prescribed intervals and this processing is executed at each of the CPUs 110, 120 and 130.

Step 600 is to detect whether or not the voltage Vcc supplied to the CPUs 110, 120 and 130 is up to a prescribed voltage, and whether or not voltage +B of the vehicle-mounted battery 160 is a low voltage of up to a prescribed voltage. Because a low voltage may lead to an erroneous operation of the sensor, the actuator or the controller 100

(erroneous update of data in the SRAM regions (2) and (4), for example), storage of the DIAG code into the SRAM regions (2) and (4) is discontinued, thus completing this processing.

In a non-low-voltage state, step 610 judges or detects whether or not an abnormality has been detected during the abnormality detection described later. This detects, for example, the state of the flag XDOO set in the usual RAM regions (1) and (3) indicating that the water temperature sensor is abnormal. When no abnormality is detected, this processing shall be ended. When an abnormality is detected, step 620 copies the DIAG code stored in the usual RAM regions (1) and (3) into the SRAM regions (2) and (4) to end the processing. For example, the established flag XEOO is set in the SRAM regions (2) and (4), which indicates that the water temperature sensor is abnormal.

FIG. 6 is a flowchart illustrating detection of an abnormality of the water temperature sensor as a typical example of abnormality detection. It is started every time an output value of the water temperature sensor is A/D (analog-to-digital) converted. Various abnormality detecting operations are shared among the CPUs 110, 120 and 130 for execution.

Step 700 is to read in the A/D-value of a signal from the water temperature sensor. Whether or not the A/D-value is abnormal is detected at step 710. Manners of detection include, for example, determining as an abnormality a case where an A/D-value is not within a prescribed range. If normal, a normal processing (for example, writing the A/D-value in a prescribed RAM region) is executed at step 720 to end the processing. When abnormal, a fail-safe processing (for example, writing a prescribed value in a prescribed RAM region) is executed at step 730, and then a flag XDOO is set at the step 740 to end the processing.

The processing done in response to a code read request in the controller 100 is now described.

FIG. 7 is a flowchart illustrating processing carried out by the CPU 110 of the controller 100 for a code read request from the diagnosis unit 200, which is started at prescribed intervals.

The presence of a code read request from the diagnosis unit 200 is detected at step 800. More specifically, this detection is accomplished through determination as to whether or not data transmitted from the diagnosis unit 200 has a construction as shown in FIG. 4A. When there is no code read request, this processing comes to an end. [0020]

When there is a code erase request, step 810 detects whether or not code erase is currently in execution. More specifically, this detection is based on whether or not count value of a counter CNT described later is at 500 msec or more. When the count value of the counter CNT is 500 msec or less, i.e., when code erase is in execution, information showing absence of an abnormality code, i.e., information after code erase is returned or sent out to the diagnosis unit 200 at step 820. When the count value of the counter CNT is 500 msec or more, i.e., when code erase is not in execution, the DIAG code detected by the CPU 110 and stored in the SRAM regions (2) and (4) and the DIAG code detected by the CPUs 120 and 130 and stored in the DMA region (5) are searched, the result is returned to the diagnosis unit 200.

Now, the processing for the code erase request at the controller 100 is as follows.

Figure 8:
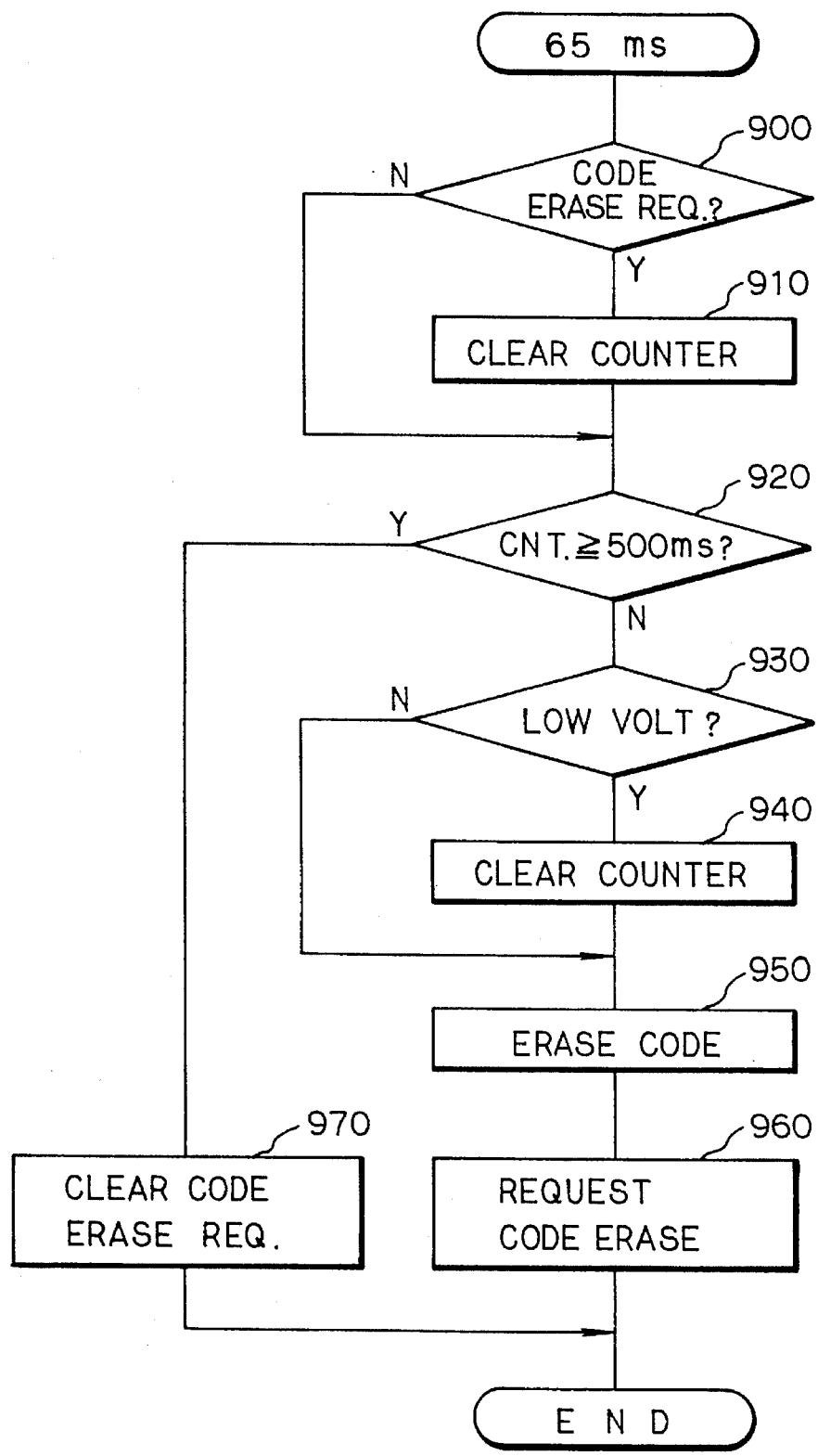
FIG. 8 is a flowchart illustrating processing by the main CPU for a code erase request.

FIG. 8 is a flowchart illustrating processing carried out by the CPU 110 of the controller 100 for a code erase request issued by the diagnosis unit 200. This is started at prescribed intervals (every 65 msec, for example).

Step 900 is to detect the presence of a code erase request from the diagnosis unit 200 during the period from the preceding start to the current one. More specifically, this detection is based on determination whether or not data transmitted from the diagnosis unit 200 has a construction as shown in FIG. 4B.

When there is no code erase request, the process proceeds to step 920. When there is a code erase request, the counter CNT which counts the time lapse from the start of code erase is cleared at the step 910, and then the process proceeds to step 920.

The step 920 detects whether or not the count value of the counter CNT is 500 msec or more. When the count value of the counter CNT is 500 msec or less, i.e., when code erase is judged to be in execution by the other CPUs 120 and 130, step 930 detects whether or not the condition is of a low voltage. If the condition is not of a low voltage, the process proceeds to step 950. If a low voltage is detected, the counter CNT is cleared at step 940, and the process proceeds to the step 950.

At this point, the counter CNT is cleared because a low voltage may cause an erroneous operation in data update of the SRAM regions (2) and (4) in this embodiment, as described above (see FIG. 5).

Code erase is executed at the step 950. The code erase request is transmitted to the other CPUs 120 and 130 at step 960, thus coming to an end of the processing. More specifically, data representing the code erase request is written in a prescribed address of the DMA region (5).

When the count value of the counter CNT is 500 msec or more at the step 920, i.e., when code erase by the other CPUs 120 and 130 is judged to have been completed, the code erase request written in the prescribed address of the DMA region (5) is cleared at step 970, and this processing comes to an end.

Figure 9:
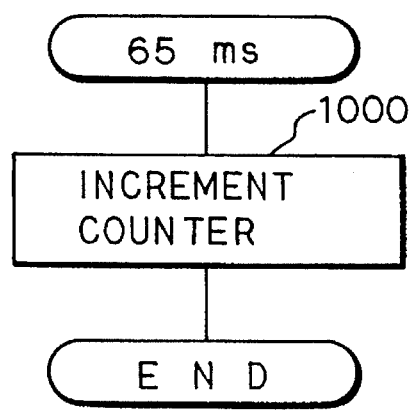
FIG. 9 is a flowchart illustrating processing for making an increment of a counter CNT at prescribed intervals.

FIG. 9 is a flowchart illustrating processing for causing an increment of the above-mentioned counter CNT at prescribed intervals (every 65 msec, for example).

This processing is completed by giving an increment (CNT←CNT+1) to the counter CNT at step 1000.

Figure 10:
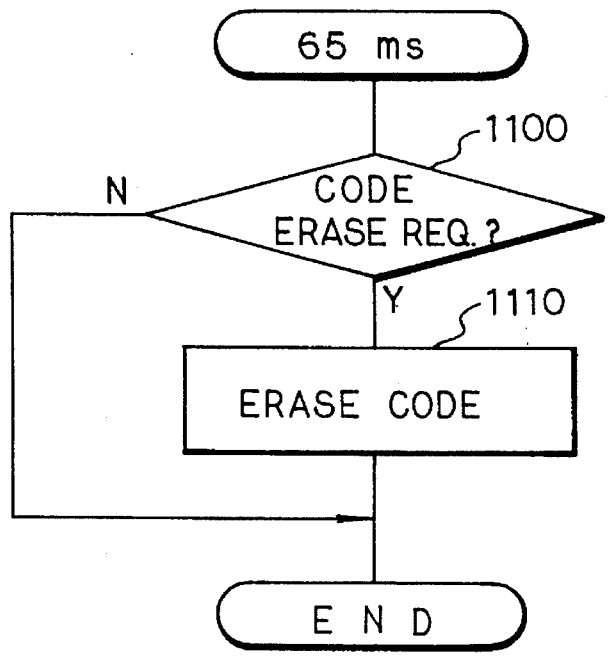
FIG. 10 is a flowchart illustrating code erase operation by the other CPUs for a code erase request from the main CPU.

FIG. 10 is a flowchart illustrating code erase operation conducted by the other CPUs 120 and 130 for the code erase request from the CPU 110, and this is started at prescribed intervals (every 65 msec, for example). A code erase request is detected at the step 1100. More specifically, this is the detection of a prescribed address value of the DMA region transmitted from the CPU 110, i.e., the results of the steps 960 and 970 shown in FIG. 8. When there is no code erase request, this process comes to an end. If there is a code erase request, code erase is executed at step 1110 to finish this processing.

Processing by the CPU 110 of the controller 100 is now described below.

Figure 11:
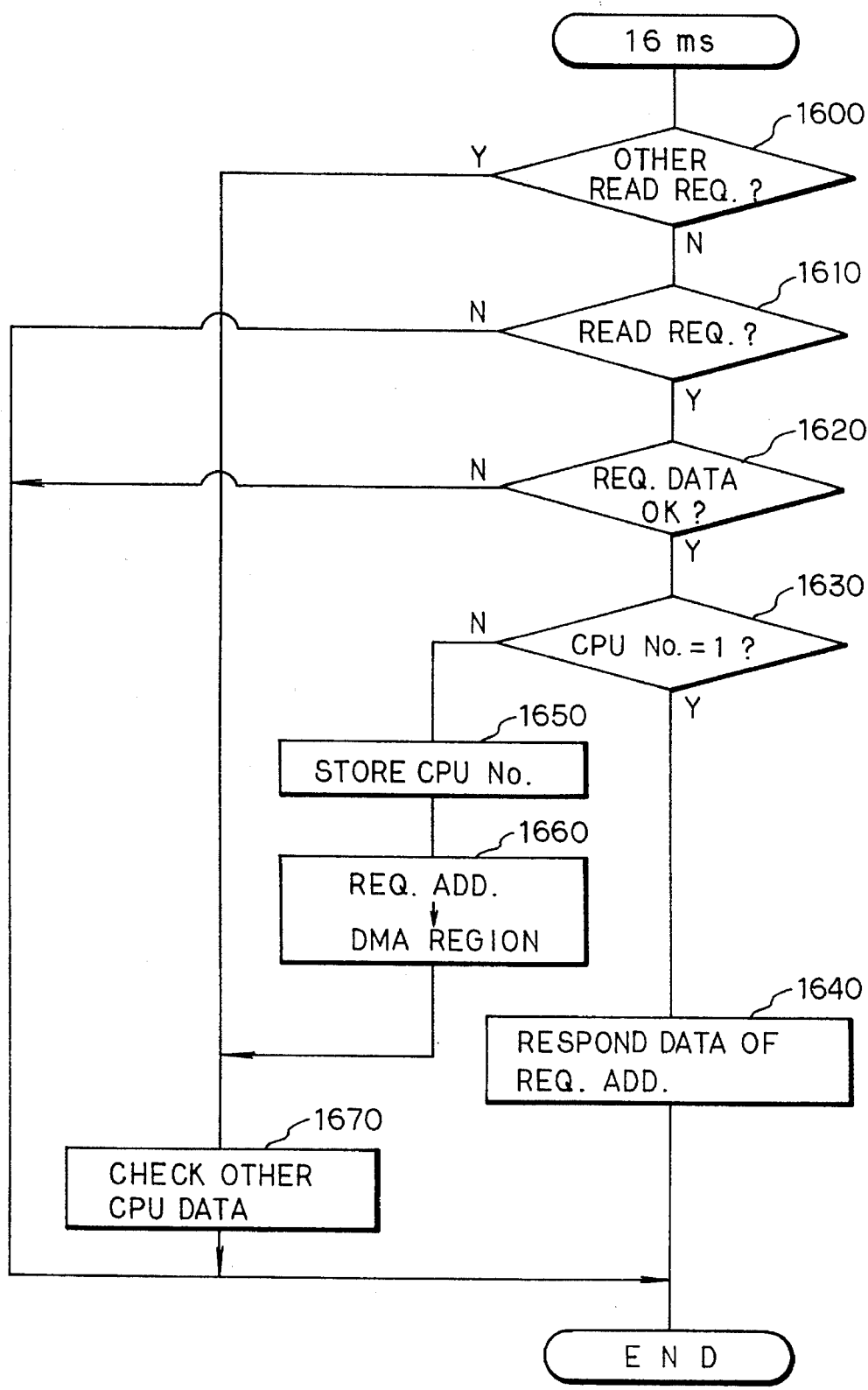
FIG. 11 is a flowchart illustrating processing by the main CPU for a RAM-value read request from the diagnosis unit.

FIG. 11 is a flowchart illustrating processing by the CPU 110 for a RAM-value read request from the diagnosis unit 200, and this is started at prescribed intervals (every 16 msec, for example).

Step 1600 is to detect whether or not there is already another RAM-value read request and data input thereof being waited for. When data input is being waited for, the process proceeds to step 1670. If data input is not waited for, then the presence of a RAM-value read request from the diagnosis unit 200 is detected at step 1610. More specifically, this detection is based on the determination whether or not the data transmitted from the diagnosis unit 200 has the construction as shown in FIG. 4c. When there is no RAM-value read request, on the other hand, this processing comes to an end.

When it is determined at step 1610 that there is a RAM-value read request, the step 1620 is performed to detect whether or not the number and the required address value of the covered CPU of the transmitted data of the RAM-value read request are in prescribed formats. If not in prescribed formats, the data transmitted from the diagnosis unit 200 is judged to be abnormal, and this processing is completed. If in prescribed formats, step 1630 detects whether or not the number of the CPU covered by the RAM-value read request is 1 as corresponding to the CPU 110.

When the CPU in question has the number 1 at step 1630, i.e., when the CPU in question is the CPU 110, the process proceeds to step 1640, and the RAM-value of requested address is loaded on a transmission buffer as a response to the diagnosis unit 200.

When the CPU in question has the number 2 or 3 at the step 1630, i.e., when the CPU in question is judged not to be the CPU 110, on the other hand, the RAM-value read request to the CPU 120 or 130 is executed at steps 1650 and 1660.

Then, the status of transmission from the CPU 120 or 130 is checked at step 1670 as a response to the diagnosis unit 200 (details are described later).

Figure 12:
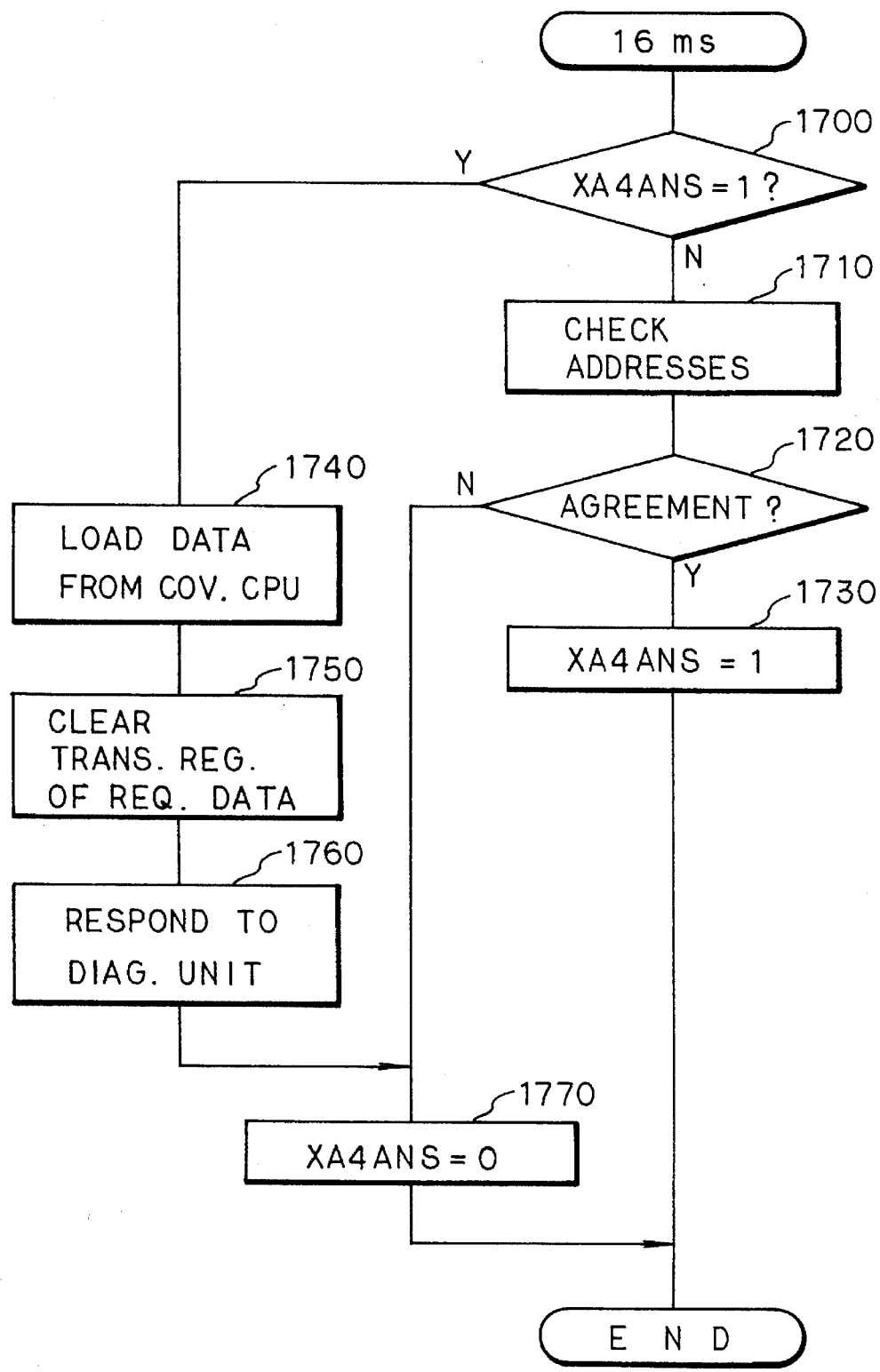
FIG. 12 is a flowchart illustrating processing for checking up the status of transmission of RAM-values from the other CPUs and sending the result to the diagnosis unit as a response.

FIG. 12 is a flowchart illustrating processing as a response to the diagnosis unit 200 through checkup of the status of transmission of the RAM-value from the CPU 120 or 130 at the step 1670 in FIG. 11.

Step 1700 is to detect whether or not the timing of returning or sending out a response to the diagnosis unit 200 is appropriate. More specifically, this detection is based on determination of the status of a flag XA4ANS set at a timing when the address value requested by the CPU 110 to the CPU 120 or 130 agrees with the address value transmitted from the CPU 120 or 130 to the CPU 110.

If the timing is not that of the flag XA4ANS=0, i.e., that currently corresponding to the controller 100, the requested address value is checked with the transmitted address value at step 1710. The following step 1720 is to detect whether or not the requested address value agrees with the transmitted address value. If not in agreement, the process proceeds to step 1770. If in agreement, the above-mentioned flag XA4ANS is set at step 1730.

When the timing is that a prescribed period of time (16 msec, for example) has passed after agreement between the requested address value and the transmitted address value, as expressed by the flag XA4ANS=1 at the step 1700, this currently corresponding to the controller 100, the response is processed at the steps 1740 to 1770. The RAM-value received from the covered CPU is first loaded onto the transmission buffer at step 1740. Then, the requested address transmission region of the DMA region (5) is cleared at step 1750. Subsequently, the data in the transmission buffer is returned to the diagnosis unit 200 as a response at step 1760, and the process proceeds to the step 1770.

This processing is completed by resetting the flag XA4ANS at the step 1770.

Now, processing at the CPUs 120 and 130 of the controller 100 is described below.

Figure 13:
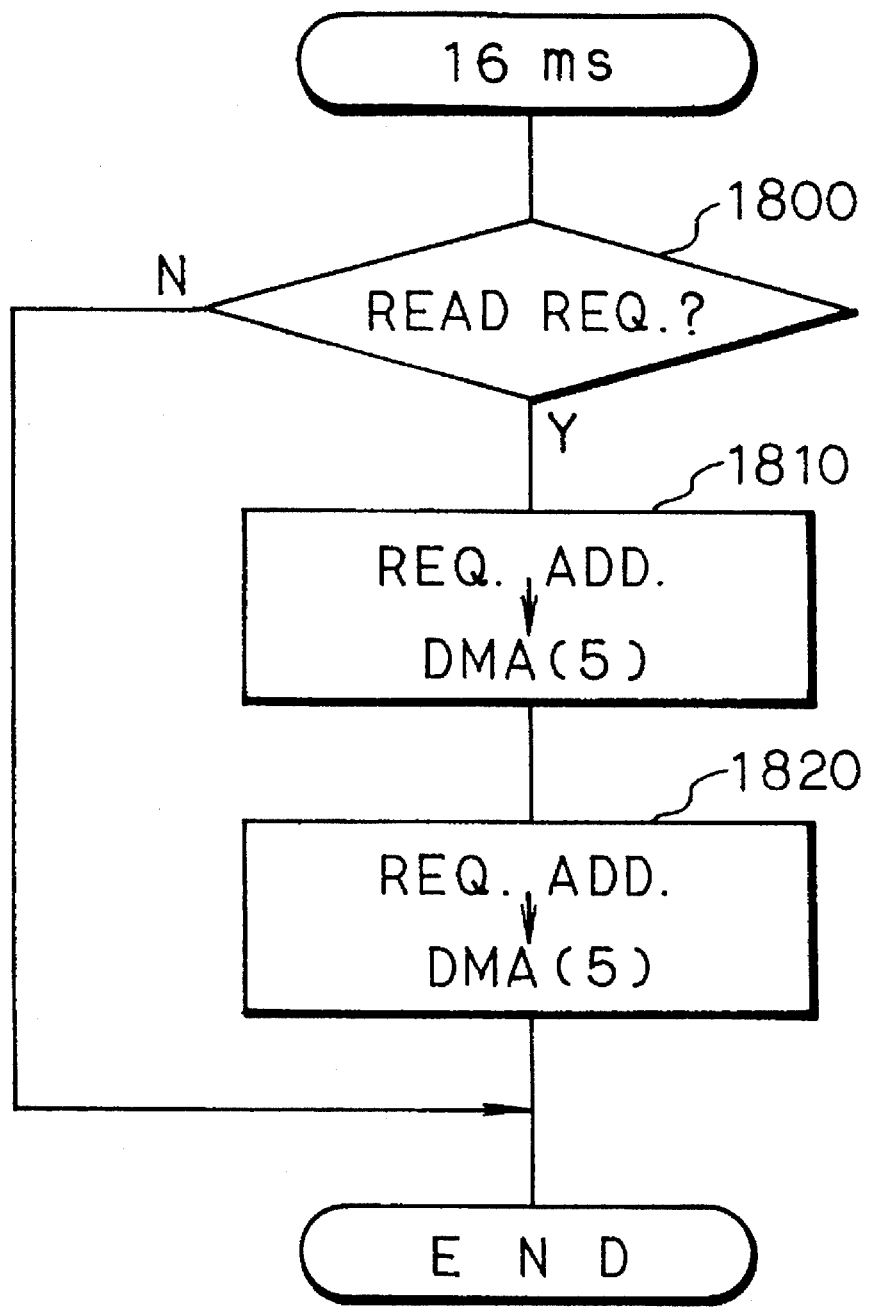
FIG. 13 is a flowchart illustrating processing by the other CPUs for a RAM-value read request from the diagnosis unit.

FIG. 13 is a flowchart illustrating processing at the CPUs 120 and 130 for a RAM-value read request from the diagnosis unit 200, and this is started at prescribed intervals (every 16 msec, for example). The same processing is effected in the CPUs 120 and 130.

Step 1800 is to detect the presence of a RAM-value read request. More specifically, this detection is based on determination whether or not a requested address representing a RAM-value read request has been transmitted from the CPU 110 to the prescribed address of the DMA region (5). When the requested address is $0000, a RAM-value read request is judged to be non-existent. If the requested address is $0000, i.e., there is no RAM-value read request, this processing comes to an end.

Figure 14:
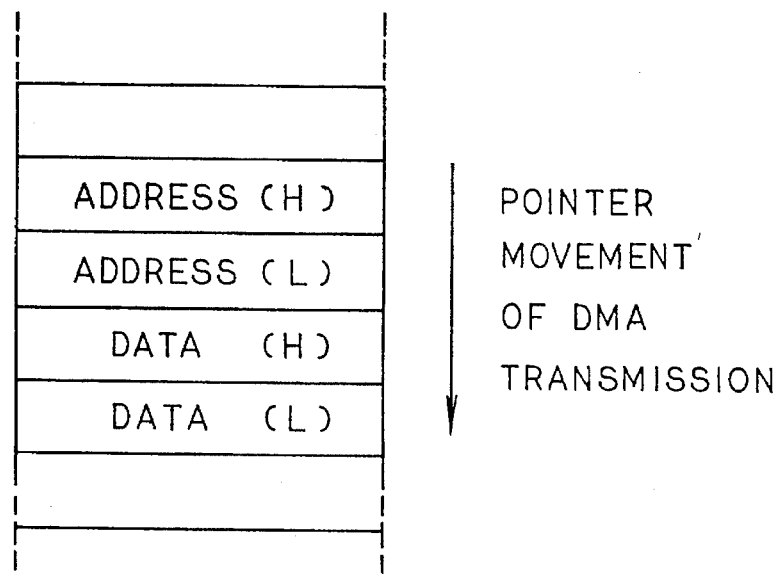
FIG. 14 is a schematic representation illustrating a layout of the DMA region conducting transmission to the main CPU for a RAM-value read request.

When the requested address is other than $0000, i.e., when there is a RAM-value read request, transmission is made to the CPU 110 at steps 1810 and 1820. FIG. 14 illustrates a layout of the DMA region (5) conducting transmission to the CPU 110 for a RAM-value read request. In this layout, the address (H), the address (L), the data (H) and the data (L) are transmitted in this order by DMA to the CPU 110 at prescribed intervals (every 4 msec, for example). (H) represents the first eight bits of the 16-bit data, and (L) represents the latter eight bits of the 16-bit data.

The RAM-values of the requested address, i.e., the data (H) and the data (L), are written into the DMA region (5) at the step 1810. The requested address values, i.e., the address (H) and the address (L), are written into the DMA region (5) at the step 1820, to finish this processing.

Now, processing regarding DMA communication at the CPUs 110, 120 and 130 is described below.

Figure 15:
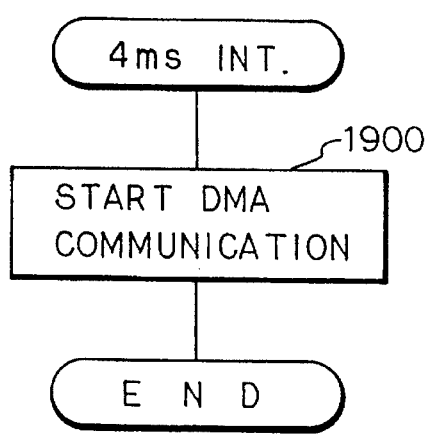
FIG. 15 is a flowchart illustrating processing by software regarding DMA communication executed by the CPUs.

FIG. 15 is a flowchart illustrating processing by software regarding DMA communication executed by each of the CPUs 110, 120 and 130, and this is started at prescribed intervals (every 4 msec, for example).

At step 1900, DMA communication is started to complete this processing. More specifically, the leading address of the DMA region (5) is set as the pointer for DMA communication.

Starting DMA communication is the only portion in which software participates in actual DMA communication, and after starting, hardware transmits data in the DMA region (5) sequentially to the other CPUs.

In the above-mentioned embodiment, as described above and as shown in steps 810 to 830 of FIG. 7, when code erase is in execution upon code read request, an abnormality code is not searched from SRAM to transmit the result to the diagnosis unit, but the data after code erase (without an abnormality code) is transmitted to the diagnosis unit. When code erase is in execution upon code read request, therefore, it is possible to prevent the data before erase from being transmitted to the diagnosis unit. By this function, transmission of erroneous information to the diagnosis unit can be prevented.

In the above-mentioned embodiment, when the presence of a RAM-value read request of the CPU 120 or 130, other than the CPU 110, at the step 1600 shown in FIG. 11 upon a RAM-value read request, the processing proceeds to that shown in FIG. 12. At the steps 1710 to 1720 shown in FIG. 12, the requested address value from the CPU 110 to the CPU 120 or 130 is checked up with the transmitted address value from the CPU 120 or 130 to the CPU 110 for agreement, and upon detection of agreement of the both address values, a flag XA4NAS is set. After the lapse of a prescribed period of time (16 ms) from setting of this flag, a RAM-value corresponding to the requested address is transmitted as a response to the diagnosis unit 200 at the steps 1740 to 1760. It is therefore possible to prevent erroneous information from being responded to the diagnosis unit 200 without fail.

According to the construction and the functions of the vehicle diagnosis system of the present invention as described above, when a read request of an abnormality signal is issued by the diagnosis unit during erase execution of the abnormality information of the controller upon an erase request of the abnormality information, the abnormality information transmitting device transmits the abnormality information after erase.

This permits, when a read request of abnormality information is issued by the diagnosis unit during erase execution of abnormality information in the controller for an erase request of abnormality information from the diagnosis unit, returning the abnormality information after erase to the diagnosis unit as a response, thus preventing transmission of erroneous information.

Further, according to the construction and the functions of the vehicle diagnosis system of the present invention, the responding device responsively transmits to the diagnosis unit the control information written into the second direct memory access region only after the prescribed interval from the agreement of the address value written into the second direct memory access region with the requested address value. Thus, since the control information corresponding to the address value can be assuredly transmitted to the diagnosis unit when the address values written into the first and second direct memory access regions agrees with each other, transmission of erroneous information to the diagnosis unit can be prevented.

What is claimed is:

1. A vehicle diagnostic system comprising:

a controller installed in a vehicle for detecting various abnormalities and storing information about such abnormalities in storage means thereof, and a diagnostic unit connectable to said controller and having read requesting means to request a read-out of the abnormality information stored in said storage means and erase request means to request erasure of the abnormality information stored in said storage means, wherein said controller is provided with:

abnormality information erasing means for erasing the abnormality information stored in said storage means in response to an erase request of the abnormality information from said erase requesting means;

erase condition detecting means for detecting whether the abnormality information is being erased; and abnormality information transmitting means for transmitting the abnormality information stored in said storage means to said diagnostic unit in response to a read request of the abnormality information from said read requesting means when said erase condition detecting means detects no erase condition, for preventing erroneous output of pre-erasure abnormality information from said controller to said diagnostic device when said erase condition detecting means detects erase an condition, and during erasing of the abnormality information by said abnormality information erasing means, for transmitting predetermined information indicative of no abnormality.

2. A vehicle diagnostic system comprising:

storage means for detecting various abnormalities of a vehicle and for storing abnormality information;

abnormality information erasing means for erasing abnormality information stored in said storage means in response to an erase signal from diagnosis means;

erase condition detecting means for detecting whether the abnormality information is being erased;

erase status detecting means for detecting whether erasure of abnormality information is in execution by said abnormality information erasing means and for preventing erroneous output of pre-erasure abnormality information from said storage means when a read command is input externally during erasure of abnormality information from said storage means; and abnormality information output means for outputting abnormality information after erasure, when said erase status detecting means detects that erasure of abnormality information is in execution, in response to a read signal applied from said diagnosis means, and for outputting abnormality information stored in said storage means when said erase status detecting means detects that erasure of abnormality information is not in execution.

3. A vehicle diagnostic system as claimed in claim 2, wherein said erase status detecting means includes:

measuring means which measures time from receiving of the erase signal from said diagnostic means; and erase status determining means which determines whether or not erase of abnormality information is in execution, in reference to the measured time.

4. A vehicle diagnostic system as claimed in claim 3, wherein said measuring means includes:

battery voltage detecting means which detects battery voltage;

low voltage detecting means which detects whether or not said battery voltage is up to a prescribed value; and clearing means which clears the measured time when said low voltage detecting device detects that said battery voltage is up to the prescribed voltage.

5. A vehicle diagnostic system comprising:

a plurality of CPUs including other CPUs and a main CPU which controls vehicle operation, detects various abnormalities and conducts information communication with an external device;

a plurality of storage devices provided in said plurality of CPUs for storing abnormality information detected by the individual ones of the plurality of CPUs, wherein said main CPU includes:

erase instruction output means for outputting an abnormality information erase instruction to the other CPUs in response to an erase signal from said external device;

erase instruction output means for outputting an abnormality information erase instruction to the other CPUs when no erase signal from said external device is received, and for outputting predetermined data to the other CPUs when an erase signal has been received;

erase status detecting means for detecting whether an erase signal has been received.

6. A vehicle diagnostic system as claimed in claim 5, wherein said storage device includes:

DMA means which transmits information individually stored through direct memory access to the other storage device.

7. A vehicle diagnostic system comprising:

a controller including a plurality of control means, each of said control means having a CPU for control of vehicle operation on the basis of vehicle information and a RAM storing control information, said control means being connected so as to permit transmission and receiving of data through direct memory access; and a diagnostic unit connectable to said controller and including:

read requesting means for requesting the reading of control information stored at a desired address of said RAM;

read request address writing means for writing said desired address corresponding to said read request of control information from said read requesting means into a first direct memory access region;

read information writing means for writing control information and an address value corresponding to said desired address written in said first direct memory access region into a second direct memory access region; and responding means for sending control information written in said second direct memory access region to said diagnostic unit as a response when there is agreement between the address value in said second direct memory access region and said desired address value and upon lapse of a prescribed period of time after the agreement.

8. A vehicle diagnostic system comprising:

a main CPU having a RAM for storing information, said main CPU performing data communication with an external diagnosis unit, and at least one other CPU having a RAM for storing control information, said at least one other CPU calculating an amount of vehicle control in accordance with a prescribed control program, wherein said main CPU includes:

instruction signal receiving means for receiving an instruction signal for reading out desired control information in the control information stored in the RAM of said at least one other CPU;

read requesting means for causing a first storage area of said at least one other CPU to store a requested address corresponding to said desired control information in response to the request of said instruction signal;

a second storage area for storing said requested address responded by said at least one other CPU;

a third storage area for storing requested address data corresponding to the requested address responded by said at least one other;

response completion detecting means for detecting a completion of response signal from the at least one other CPU in response to agreement between the value stored in the second storage area and said requested address; and desired control information transmitting means for transmitting the requested address data stored in said third storage area to said external diagnosis unit in response to detection of said completion of response signal, and for transmitting predetermined data to prevent erroneous output to said external diagnosis unit when no completion of response signal is detected by said response completion detecting means;

wherein each said at least one other CPU includes:

requested address data reading means for reading out the requested address data corresponding to said requested address stored in said first storage area from said RAM; and desired control information responding means for causing said third storage area to store said requested address data and then for causing said second storage area to store said address.

9. A vehicle diagnosis system as claimed in claim 8, wherein said response completion detecting means includes:

time measuring means which measures lapse of time from agreement between the value stored in said second storage area and said requested address; and response completion determining means which determines the lapse of a prescribed period of time to correspond to completion of response to said other CPU.

10. A vehicle diagnosis system as claimed in claim 8, wherein data communication between said RAM of said main CPU and said RAM of said other CPU is performed through direct memory access.

11. A vehicle diagnostic device as claimed in claim 8, wherein said instruction signal receiving means includes:

abnormality detecting means which determines non-agreement of said instruction signal with a prescribed format to mean a communication abnormality.

\* \* \* \* \*